United States Patent [19]

Ota et al.

[11] Patent Number: 5,003,498
[45] Date of Patent: Mar. 26, 1991

[54] GRAPHIC DISPLAY METHOD

[75] Inventors: Yoshimi Ota; Hiroshi Arai; Misato Nio, all of Hitachi, Japan

[73] Assignee: Hitachi, Ltd., Tokyo, Japan

[21] Appl. No.: 2,225

[22] Filed: Jan. 12, 1987

[30] Foreign Application Priority Data

Jan. 13, 1986 [JP] Japan .................................. 61-3444
Jan. 16, 1986 [JP] Japan .................................. 61-4933

[51] Int. Cl.⁵ .......................................... G06F 15/626
[52] U.S. Cl. ..................................... 364/522; 364/521; 340/750
[58] Field of Search ............... 340/724, 734, 747, 727, 340/729, 750; 364/521, 522; 382/22, 44, 45, 46

[56] References Cited

U.S. PATENT DOCUMENTS

| | | | |
|---|---|---|---|
| 3,809,868 | 5/1974 | Villalobos et al. | 235/151 |
| 4,152,766 | 5/1979 | Osofsky et al. | 364/515 |
| 4,384,338 | 5/1983 | Bennett | 364/522 |
| 4,555,775 | 11/1985 | Pike | 364/900 |
| 4,649,498 | 3/1987 | Kedem et al. | 364/518 |
| 4,677,575 | 6/1987 | Redin | 340/747 |
| 4,698,779 | 10/1987 | Holden et al. | 364/520 |
| 4,712,248 | 12/1987 | Hango | 382/22 |
| 4,725,831 | 2/1988 | Coleman | 340/747 |
| 4,736,306 | 4/1988 | Christensen et al. | 364/513 |
| 4,766,556 | 4/1988 | Arakawa | 364/522 |
| 4,783,829 | 11/1988 | Miyakawa et al. | 382/22 |
| 4,858,149 | 8/1989 | Quarendon | 364/522 |
| 4,888,583 | 12/1989 | Ligocki et al. | 340/729 |

OTHER PUBLICATIONS

Voelcker et al., "Solid Modeling; A History Summary and Contemporary Assessment", 1982, IEEE C.G.A., pp. 7–24.
Anderson, D.C., "Closing the Gap: A Workstation-Mainframe Connection", Computers in Mechanical Engineering, May, 1986, pp. 16–24.
Calkins, D.E., "An Automated Sculpted Surface CAD Procedure Based on High Level Computer Graphics and Expert System", Computers in Engineering 85, pp. 119–126.
Tilove, R.B., "A Null-Object Detection Algorithm for Constructive Solid Geometry Communications of the ACM", 7/84, pp. 684–694.
Cohen et al., "An Efficient Radiosity Approach for Realistic Image Synthesis", IEEE CG & A, 3/86, pp. 26–35.
Weghorst et al., "Improved Computational Methods for Ray Tracing", ACM Transactions on Graphics, 1/84, pp. 52–69.
Takala, T., "User Interface Management System with Geometric Modeling Capability: A CAD System'-Framework", IEEE CG & A, 1/85, pp. 42–50.
Potmesil, M., "Generating Octree Models of 3D Objects from Their Silhouettes in a Sequence of Images", CVGIP, 1987, pp. 1–29.
Adams et al., "Combining Descriptive and Computational Geometry", Computers in Mechanical Engineering, 5/86, pp. 69–76.

Primary Examiner—Dale M. Shaw
Assistant Examiner—Phu K. Nguyen
Attorney, Agent, or Firm—Antonelli, Terry, Stout & Kraus

[57] ABSTRACT

A three-dimensional shape as a synthesis of three-dimensional geometry entities is controlled and displayed. The geometry entities are controlled in accordance with information defining the geometry entities, and layout information arranged in a three-dimensional space. An interface between graphic display apparatus using this graphic display method and an application system is practiced in that the transfer of the information on the geometry entities is carried out. The three-dimensional shape is divided into its geometry entities, and the display of an object having a three-dimensional shape is done as a synthesis of the geometry entities, the transfer of shape data being done separately for each geometry entity.

10 Claims, 18 Drawing Sheets

FIG. 10

| ADDRESS | NUMBER OF WORDS | CONTENTS |
|---|---|---|
| 0 | 1 | POINTER i FOR WINDOW CONTROL INFORMATION |
| 1 | 1 | POINTER j FOR PRIMITIVE AGGREGATE INFORMATION |
| 2 | 1 | POINTER k FOR PRIMITIVE INFORMATION |
| 3 | 1 | POINTER l FOR DISPLAY ATTRIBUTE INFORMATION |
| 4 | 1 | POINTER FOR EMPTY AREA |
| ~ | ~ | |
| i | $n_i$ | WINDOW CONTROL INFORMATION |
| ~ | ~ | |
| j | $n_j$ | PRIMITIVE AGGREGATE INFORMATION |
| ~ | ~ | |
| k | $n_k$ | PRIMITIVE INFORMATION |
| ~ | ~ | |
| l | $n_l$ | DISPLAY ATTRIBUTE INFORMATION |
| ~ | ~ | |

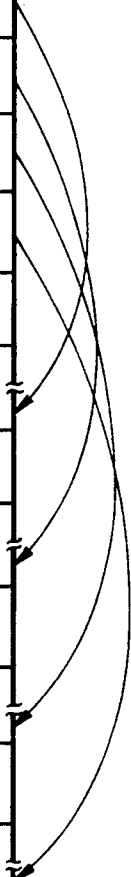

FIG. 11A

| ADDRESS | NUMBER OF WORDS | CONTENTS |
|---|---|---|
| i | 1 | POINTER FOR SUBSEQUENT WINDOW INFORMATION |
| i+1 | 1 | INTERNAL NAME OF WINDOW |
| i+2 | 2 | EXTERNAL NAME OF WINDOW |
| i+4 | 1 | PROJECTION TYPE(0:PARALLEL, 1:PERSPECTIVE) |
| i+5 | 3 | POSITION OF VIEWING POINT |
| i+8 | 9 | PROJECTION MATRIX |
| i+17 | 4 | DISPLAY RANGE ON WINDOW(MINIMUM AND MAXIMUM DISPLAY RANGES ON PICTURE FRAME) |
| i+21 | 6 | DISPLAY RANGE IN MODELING SPACE(MINIMUM AND MAXIMUM RANGES IN MODELING SPACE) |
| i+27 | 1 | TYPE OF LIGHT SOURCE(0:PARALLEL, 1:SPOT LIGHT SOURCE) |
| i+28 | 3 | POSITION OF LIGHT SOURCE(TYPE OF LIGHT SOURCE=0) OR DIRECTION(TYPE OF LIGHT SOURCE=1) |
| i+31 | 1 | COLOR AND LUMINANCE OF LIGHT SOURCE |
| i+32 | 1 | COLOR AND LUMINANCE OF AMBIENT LIGHT |

FIG. 11B

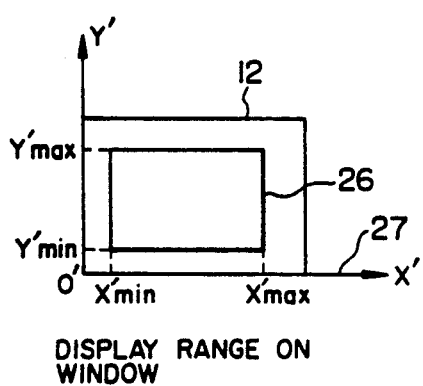

DISPLAY RANGE ON WINDOW

FIG. 11C

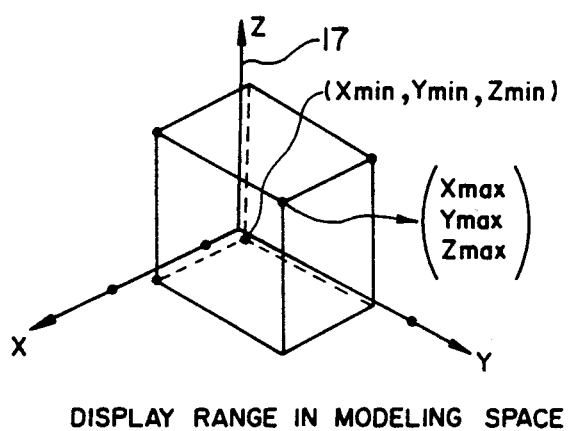

DISPLAY RANGE IN MODELING SPACE

FIG. 12

| ADDRESS | NUMBER OF WORDS | CONTENTS |
|---|---|---|
| j | 1 | POINTER FOR SUBSEQUENT PRIMITIVE AGGREGATE INFORMATION |
| j+1 | 1 | INTERNAL NAME OF PRIMITIVE AGGREGATE |
| j+2 | 2 | EXTERNAL NAME OF PRIMITIVE AGGREGATE |
| j+4 | 1 | POINTER k FOR PRIMITIVE INFORMATION |

FIG. 13

| ADDRESS | NUMBER OF WORDS | CONTENTS |
|---|---|---|
| k | 1 | POINTER FOR SUBSEQUENT INFORMATION |
| k+1 | 1 | INTERNAL NAME OF PRIMITIVE SOLIDS |
| k+2 | 2 | EXTERNAL NAME OF PRIMITIVE SOLIDS |
| k+4 | 1 | AGGREGATE DESCRIBING MODE |
| k+5 | 3 | AMOUNT OF MOVEMENT $P_o$ |
| k+8 | 9 | AMOUNT OF TURNING $[F]$ |
| k+17 | 1 | POINTER FOR DISPLAY ATTRIBUTE INFORMATION |
| k+18 | 1 | POINTER FOR SUBSEQUENT PRIMITIVE INFORMATION |
| k+19 | 1 | POINTER FOR PRIMITIVE AGGREGATE INFORMATION |
| k+20 | 2 | NAME OF RESTRAINING PRIMITIVE |
| k+21 | 1 | NUMBER OF CONSTITUENT SURFACE |
| k+22 | 1 | AMOUNT(m) OF DATA ON PARAMETERS OF PRIMITIVE SHAPE |
| k+23 | m | PARAMETERS OF PRIMITIVE SHAPE |

FIG. 14A

| ADDRESS | NUMBER OF WORDS | CONTENTS |
|---|---|---|
| 1 | 1 | POINTER FOR SUBSEQUENT DISPLAY ATTRIBUTE INFORMATION |
| 1+1 | 1 | INDEX OF DISPLAY ATTRIBUTE |
| 1+2 | 3 | REFLECTION COEFFICIENT OF AMBIENT LIGHT(IN THE ORDER OF R,G AND B) |
| 1+5 | 3 | DIFFUSE REFLECTION COEFFICIENT (IN THE ORDER OF R,G AND B) |
| 1+8 | 3 | DIRECT REFLECTION COEFFICIENT (IN THE ORDER OF R,G AND B) |
| 1+11 | 1 | DIFFUSE REFLECTION INDEX |
| 1+12 | 1 | DIRECT REFLECTION INDEX |
| 1+13 | 1 | REFRACTIVE INDEX |
| 1+14 | 1 | TRANSMISSIVITY |

FIG. 14B

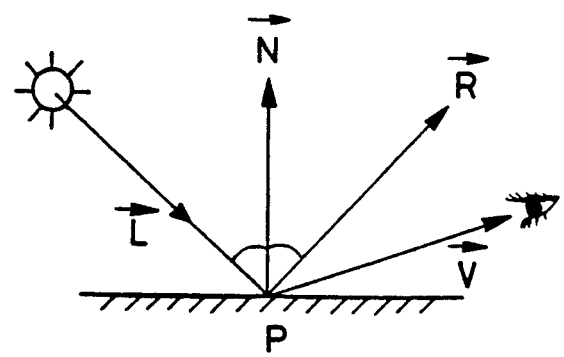

FIG. 15

| PRIMITIVE | SHAPE | SHAPE PARAMETER | PRIMITIVE TYPE |
|---|---|---|---|
| POINT | | NONE | 1 |
| STRAIGHT SEGMENT | | LENGTH A | 2 |
| CIRCLE/ARC | | RADIUS R<br>ANGLE $\theta$ | 3 |
| ELLIPSE/ ELLIPTIC ARC | | LONGER RADIUS A<br>SHORTER RADIUS B<br>ANGLE $\theta$ | 4 |
| FREE CURVE | | NUMBER N OF SEGMENTS<br>POLYGON OF SEGMENTS<br>$N*(P_1,P_2,P_3,P_4)$ | 5 |
| LOCAL COORDINATE SYSTEM | | LENGTH A IN THE x-AXIS DIRECTION<br>LENGTH B IN THE y-AXIS DIRECTION<br>LENGTH C IN THE z-AXIS DIRECTION | 6 |

FIG. 16

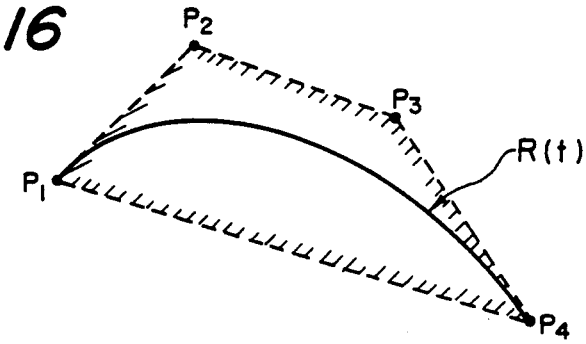

FIG. 17

| PRIMITIVE | SHAPE | SHAPE PARAMETERS | PRIMITIVE TYPE |
|---|---|---|---|
| PARALLELOGRAM | | WIDTH A<br>HEIGHT B<br>ANGLE θ<br>OPTION IOPT | 11 |
| CIRCLE | | RADIUS R<br>ANGLE θ<br>OPTION IOPT | 12 |
| ELLIPSE | | LONGER RADIUS A<br>SHORTER RADIUS B<br>ANGLE θ<br>OPTION IOPT | 13 |
| EQUILATERAL POLYGON | | RADIUS R<br>DIVIDING NUMBER N<br>OPTION IOPT | 14 |
| ARBITRARY SHAPE | | NUMBER N OF SEGMENTS<br>NAME OF SEGMENTS<br>Ai (i=1~N)<br>OPTION IOPT | 15 |

FIG. 18

| PRIMITIVE SOLID | SHAPE | PARAMETERS OF SHAPE | TYPE OF PRIMITIVE SOLID |
|---|---|---|---|
| CYLINDRICAL SURFACE | | RADIUS R <br> HEIGHT H <br> OPTION IOPT | 31 |
| CONICAL SURFACE | | RADIUS 1 $R_1$ <br> RADIUS 2 $R_2$ <br> HEIGHT H <br> ECCENTRIC AMOUNT D <br> OPTION IOPT | 32 |
| SPHERICAL SURFACE | | RADIUS R <br> CUT AMOUNT D <br> OPTION IOPT | 33 |
| TORUS SURFACE | | LARGER RADIUS $R_\ell$ <br> SMALLER RADIUS $R_S$ <br> ANGLE $\theta$ <br> OPTION IOPT | 34 |
| FREELY-CURVED SURFACE | | NUMBER OF PATCHES $N_u, N_v$ <br> PATCH CONTROL POINTS <br> $N_u * N_v * (P_1 \sim P_{16})$ <br> OPTION IOPT | 35 |

FIG. 19

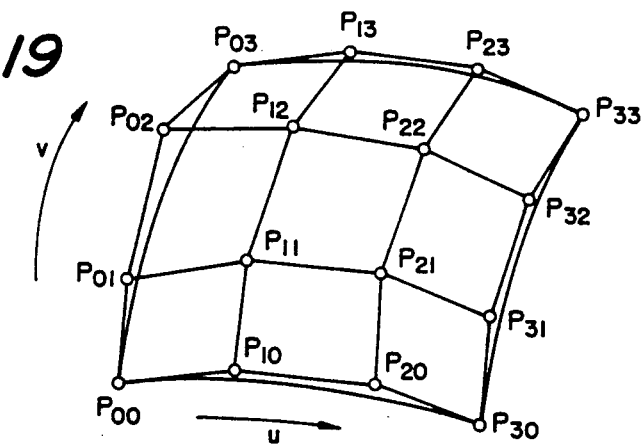

FIG. 20

| PRIMITIVE SOLID | SHAPE | PARAMETERS OF SHAPE | PRIMITIVE TYPE |
|---|---|---|---|
| RECTANGULAR SOLID | | WIDTH A<br>DEPTH B<br>HEIGHT C<br>OPTION IOPT | 41 |
| CYLINDER | | RADIUS R<br>HEIGHT H<br>OPTION IOPT | 42 |
| CONE | | RADIUS 1 $R_1$<br>RADIUS 2 $R_2$<br>HEIGHT H<br>ECCENTRIC AMOUNT D<br>OPTION IOPT | 43 |
| SPHERE | | RADIUS R<br>CUT SURFACE D<br>OPTION IOPT | 44 |
| TORUS | | LARGER RADIUS $R_\ell$<br>SMALLER RADIUS $R_S$<br>ANGLE $\theta$<br>OPTION IOPT | 45 |
| COLUMN | | NUMBER N OF SEGMENTS<br>NAME $A_i(i=1\sim N)$ OF SEGMENTS<br>HEIGHT H<br>OPTION IOPT | 46 |
| PYRAMIDAL BODY | | NUMBER N OF SEGMENTS<br>NAME $A_i(i=1\sim N)$ OF SEGMENTS<br>CONVERGING POINT P<br>HEIGHT H<br>OPTION IOPT | 47 |
| LID MADE BY THE REVOLUTION OF A TWO-DIMENSIONAL SHAPE ABOUT ONE OF ITS SIDES | | NUMBER N OF SEGMENTS<br>NAME $A_i(i=1\sim N)$ OF SEGMENTS<br>TURNING ANGLE $\theta$<br>OPTION IOPT | 48 |
| ARBITRARY THREE-DIMENSIONAL BODY | | NUMBER N OF SURFACES<br>NAME $A_i(i=1\sim N)$ OF SURFACE<br>OPTION IOPT | 49 |

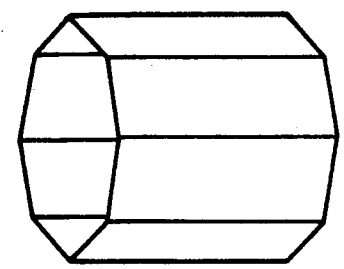
FIG. 22A
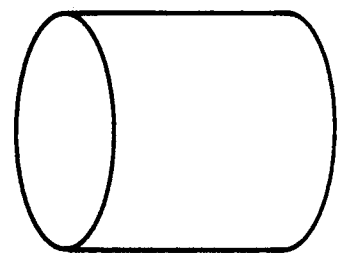
FIG. 22B
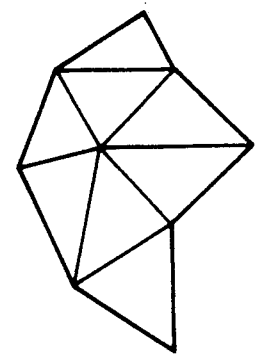
FIG. 22C
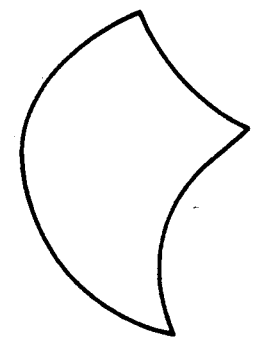
FIG. 22D
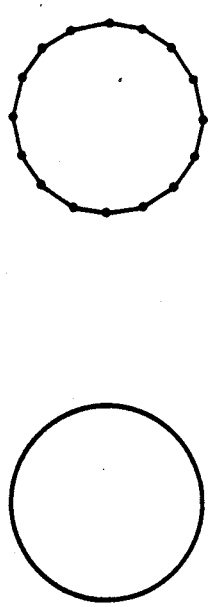
FIG. 21A
FIG. 21B
FIG. 21C
FIG. 21D
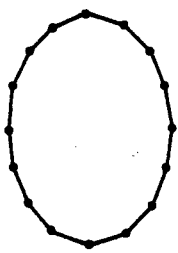
FIG. 21E
FIG. 21F

GRAPHIC DISPLAY METHOD

BACKGROUND OF THE INVENTION:

1. Field of the Invention

The present invention relates to a graphic display method wherein the graphic processing or geometric modeling functions is effected, and more particularly to a graphic display method suitably applied to a system for supporting the designing of mechanical structures. The present invention also relates to a graphic display method for the geometry modeling of the mechanical structures design, and more particularly to an arrangement of the geometric model and display method suitably used to arrange and display an image on a graphic display apparatus.

2. Description of the Prior Art

Most of the conventional graphic display apparatuses having geometric modeling functions are adapted to handle three-dimensional figures, it is necessary that a party utilizing such a graphic display apparatus reduce the number of dimensions of object figures and transfer two-dimensional figure information constituting projection information to the graphic display apparatus. A similar process must be carried out every time the view data (position and view angle) change. This causes a loss in the response speed in a three-dimensional geometric modeling system.

In order to solve these problems, graphic display apparatuses having three-dimensional geometric modeling functions have been developed. A graphic display apparatus in which the hidden lines in a three-dimensional object formed of a large number of polygons are erased as disclosed in, for example, Japanese Patent Laid-Open No. 18745/1980 or U.S. Pat. No. 3,889,107 is known well.

In a method using this graphic display apparatus, only a three-dimensional object formed of a large number of polygons can be handled, and this graphic display method is not suitable used for design of a three-dimensional shape of a mechanical structure including a complicated curved surface. Although this graphic display apparatus is capable of describing a curved surface by a minute polygons, the amount of information becomes unduly large, and a long time is required for the transformation of this information.

Most of the conventional graphic display apparatuses of this kind are adapted to handle two-dimensional figures. In order to handle three-dimensional figures, it is necessary that the dimensional conversion be done in a graphic display apparatus, and a long time is required for carrying out the geometric modeling. There is a graphic display method in which a three-dimensional object is formed of a large number of polygons. However, when the polygons are made so as to represent a curved surface, the process time increases due to an increase in the amount of polygon data.

Various systems for supporting the design of a mechanical structure by using a computer have been developed, and various effects have been obtained. Such a system is used practically as a computer aided design (CAD) between a designer and a computer. During the use of this CAD system, the designer forwards his design as he makes interactions with the computer. This designing operation is always carried out with respect to the three-dimensional shape, and it is important that the three-dimensional shape thought by the designer can be inputted easily into the computer.

However, in the most popular conventional graphic display method used in such a system, already-determined numerical values are inputted into the computer by using a keyboard or fuction key, to thereby produce a three-dimensional shape in the calculating machine. Since a designer is accustomed to a drawing of a three-dimensional shape, it is easy for him to input the two-dimensional shape into the computer. Regarding such a shape, a two-view drawing method or a three-view drawing method are known, and drawing a three-dimensional shape by utilizing this drawing has also been practiced on trial. In this method, already-determined numerical values are also inputted into the computer.

There are some other known graphic display methods, which include a method using a three-dimensional coordinate reading machine based on photography or techniques using ultrasonic waves and laser beams, so as to input the information on an actual (physical) shape or a small-scale model (plastic model), if it is available, into the computer, and a method of inputting a model into the computer by using a graduated kit as disclosed in, for example, Japanese Patent Laid-Open No. 21227/1976.

In both of these methods, an already-available shape is inputted into the computer, but a three-dimensional shape drawn in the brain of the designer cannot easily be inputted. These conventional examples are the graphic display methods in which numerical values determined in advance are inputted into the computer by using the keyboard or function key.

The graphic display method using the three-dimensional coordinate reading machine in which photography or techniques using ultrasonic waves or laser beams as the information-intaking techniques, which are utilized when an actual model is available, is a method of inputting an already-existing three-dimensional shape, and not an inputting method of a shape drawn in the brain of the designer.

SUMMARY OF THE INVENTION:

An object of the present invention is to provide a graphic display method wherein graphic processing or geometric modeling functions is effected efficiently producing an object having a three-dimensional shape.

Another object of the present invention is to provide a graphic display method wherein geometric modeling is effected, providing an interface which can set the amount of information to be transferred to a minimum level during the transfer of information between the graphic display apparatus and an application system.

A further object of the present invention is to provide a graphic display method wherein an image of a three-dimensional shape, which is drawn by an industrial designer or an artistic designer, can be easily produced and arranged in a computer by using a graphic display apparatus.

The present invention is directed to a graphic display apparatus having geometric modeling functions, which performs the steps of dividing a three-dimensional shape into a number of geometric entities (primitive solids) defining a given object three-dimensional shape as a synthesis of memorized geometric entities (primitive solids), which is obtained by moving and rotating the geometric entities (primitive solids), and displaying the defined three-dimensional shape.

The transforming of data for displaying the three-dimensional shape is done for each of the memorized geometric entities (primitive solids). A geometric entity (primitive solid) is at least one selected from segment entities, flat entities, curved surface entities, and solid entities. The defined three-dimensional shape is produced by setting an operation to at least one selected from an union, a subtraction, and an intersection and only layout mode.

The graphic display apparatus is provided with a modeling space, for modeling the three-dimensional shape, having a modeling coordinate system, and a geomety entity coordinate system for the geometry entities (primitive solids). The amount of movement and the amount of rotation of a geometry entity (primitive solid) in the modeling space are expressed by the amount of movement and the amount of rotation of the geometry entity coordinate system with respect to the modeling coordinate system.

The information to be controlled in the graphic display apparatus are window control information, synthesis information, geometry entity information, and display attribute information. The displayed three-dimensional shape is indicated by a number of windows, and each window is provided with a window coordinate system.

The present invention is directed to a graphic display and display method comprising the steps of determining two-dimensional drawings, which are taken in a number of directions, of one object to be displayed, indicating geometry entities in a divided manner on the display surface of the display unit, setting the surface of a tablet and divisional display picture frames correspondingly to each other and converting a demand by a stylus pen on the tablet into a demand for a corresponding divisional display picture frame, and carrying out the moving and rotation of each of the geometry entities (primitive solids) to thereby arrange and display a figure.

The geometry entities (primitive solids) consist of a top view, a front view and a side view, and a perspective view is also displayed in addition to the three views. The geometry entities (primitive solids) are moved or rotated on the axis of a surface of another figure. The geometry entities are moved or rotated using lattice point or radial grid for rounding numerical values.

The present invention is also directed to a graphic display method wherein graphic processing or geometric modeling functions is effected, and adapted to describe, control and display a three-dimensional shape as a synthesis of three-dimensional geometry entities (primitive solids). The geometry entities (primitive solids) are controlled in accordance with information (shape type and shape parameter etc.) defining the geometry entities (primitive solids), and layout (position and posture) information arranged in a three-dimensional space. An interface between the graphic display apparatus using this graphic display method and the application system is characterized in that the transfer of the information on the geometry entities (primitive solid units) is carried out.

A three-dimensional figure is divided into its geometry entities (primitive solids), and the displaying of an object having a three-dimensional shape is done as a synthesis of the divisional geometry entities (primitive solids), the transfer of shape data being done separately for each geometry entity (primitive solid).

According to the present invention, three-views of a drawing (top view, front view and side view) which has been used in a conventional graphic display apparatus of this kind, and a three-dimensional drawing by which a three-dimensional shape (solid view) can be grasped easily are used so that a three-dimensional image drawn in the brain of the designer can be produced simply in the interior of the computer.

A figure, a constituent element of an arbitrary three-dimensional shape is produced easily in the computer, and this figure is transferred dynamically by using the above mentioned plural-view, whereby the arrangement, such as the move, rotation and transfer of the shape is easily carried out. Regarding the arrangement of the figures, the restraining conditions between the figures can be designated by using a local coordinate system. The figure can be arranged simply by, for example, putting an arbitrary figure on a plane, or moving the figure in a plane.

A plurality of geometry entities (primitive solids) are moved and rotated, and they are rearranged and combined to thereby produce an image of an arbitrary three-dimensional shape.

BRIEF DESCRIPTION OF THE DRAWINGS:

FIG. 10 illustrates the construction of all the data controlled in the graphic display apparatus;

FIG. 11A shows the information on a window indicated on the display frame on the graphic display apparatus;

FIG. 11B shows the display range on a window;

FIG. 11C shows the display range in the modeling space;

FIG. 12 shows the information for describing synthesis of the primitive solids;

FIG. 13 shows the information for describing the arrangement of the primitive solids;

FIG. 14A shows the properties of a material for really expressing a three-dimensional shape on the display frame on the graphic display apparatus;

FIG. 14B illustrates the intensity of the light which can be observed at the point P;

FIG. 15 illustrates the geometry entity;

FIG. 16 illustrates a method of describing a free curve;

FIG. 17 illustrates the plane entities;

FIG. 18 illustrates the curved surface entities;

FIG. 19 illustrates a method of describing a free curved surface;

FIG. 20 illustrates the solid entity;

FIGS. 21A-21B illustrate a method of indicating entity of circle on the graphic display frame;

FIGS. 21C-21D illustrate a method of indicating entity of ellipse on the graphic display frame;

FIGS. 21E-21F illustrate a method of indicating entity of curve on the graphic display frame;

FIGS. 22A-22B illustrate a dividing method used to indicate entities of cylinder on the graphic display frame;

FIGS. 22C-22D illustrate a dividing method used to indicate another curved surface entities on the graphic display frame;

PREFERRED EMBODIMENTS

One embodiment of the present invention will now be described with reference to FIGS. 1-22.

Figure 1:
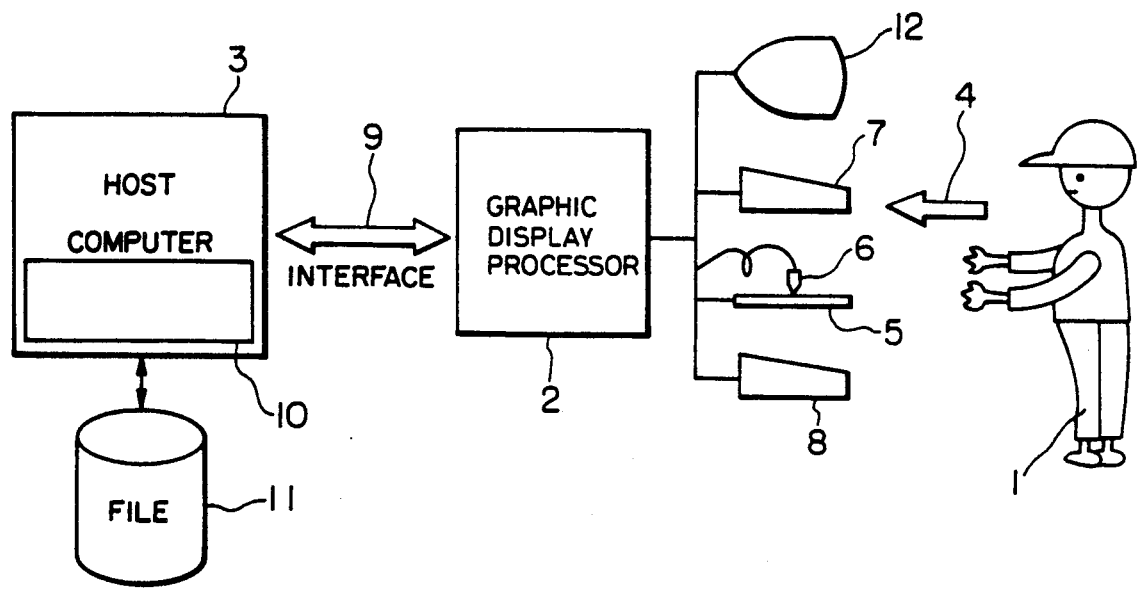
FIG. 1 is a block diagram roughtly showing the construction of a graphic display apparatus to which the present invention is applied.

FIG. 1 illustrates a system for performing interactions between a designer 1 and a graphic display control apparatus 2 or a host computer (application system) 3. A command 4 from the designer 1 is inputted into a tablet 5, a stylus pen 6, a function key 7 or a keyboard 8, and interpreted by the graphic display control apparatus 2.

When the command 4 is required to be processed by the host computer 3, it is transferred thereto via an interface means 9. The host computer 3 has an application program 10 loaded thereon, and is adapted to carry out a processing operation which cannot be carried out by the graphic display control apparatus 2.

In the host computer 3, for example, various design information or the mechanical structure as a whole, which cannot be controlled by the graphic display control apparatus 2, is controlled. Such various information can be registered on a file means 11 or retrieved, if necessary. In the graphic display control apparatus 2, the information on a geometry entity inputted by the host computer 3 or the designer 1 is controlled, and the drawing information is prepared as necessary and indicated on a graphic display means 12.

The designer 1 looks at the results indicated on the graphic display 12 to determine a subsequent action. The number of the picture frame on the graphic display 12 corresponds to that of the tablet 5, and the picture-drawing information indicated by the stylus pen 6 on the picture frame on the graphic display 12 can be identified. The designer 1 also looks at the results indicated on the graphic display 12 and inputs a subsequent command 4 into the tablet 5, the stylus pen 6, the function key 7 or the keyboard 8 to repeat similar operations.

Thus, the designer 1 produces an object having a three-dimensional shape in a memory in the graphic display control apparatus 2 as he performs interactions with the host computer 3. The three-dimensional shape thus produced is transferred on the basis of the judgement of the designer 1 to the host computer 3 through the interface means 9, controlled by the application program 10, and stored in the file means 11 as necessary.

Figure 2A:
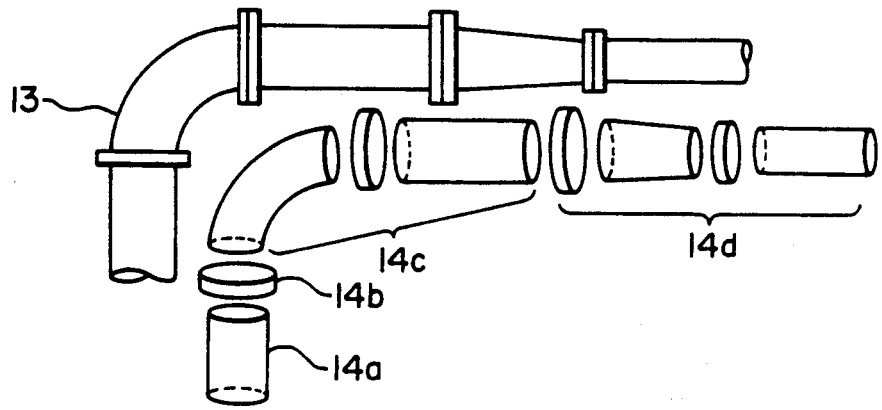
FIG. 2A is a development of the primitive solids of the piping equipment shape to controlled in the graphic display apparatus.
Figure 2B:
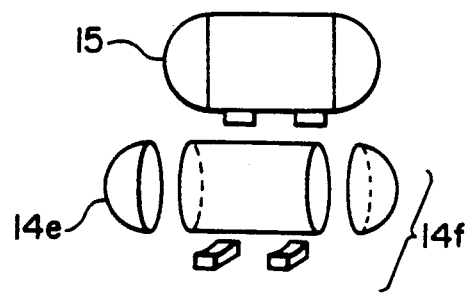
FIG. 2B is a development of the primitive solids of the vessel equipment shape to controlled in the graphic display apparatus.

A method of inputting such a three-dimensional shape will now be described. FIGS. 2A and 2B show respectively examples of three-dimensional shapes designed by such an interactive system, in which the shape of a piping equipment 13 as shown in FIG. 2A is described as a synthesis of geometry entities 14a, 14b, 14c and 14d including cylinders, a cone and a torus. In these examples, vessel equipment 15 as shown in FIG. 2B is also described as a synthesis of geometry entities 14e and 14f including a rectangular solid, a cylinder, and a sphere.

The designer 1 produces the geometry entities (primitive solids) 14a, 14b, 14c, 14d, 14e and 14f in the graphic display control apparatus 2 and arranges them in suitable positions and postures by using transfer and rotation commands. An object having a three-dimensional shape is produced by the set operation (functions of determining an union, a subtraction and an intersection) of the geometry entities 14a, 14b, 14c, 14d, 14e and 14f.

Figure 3:
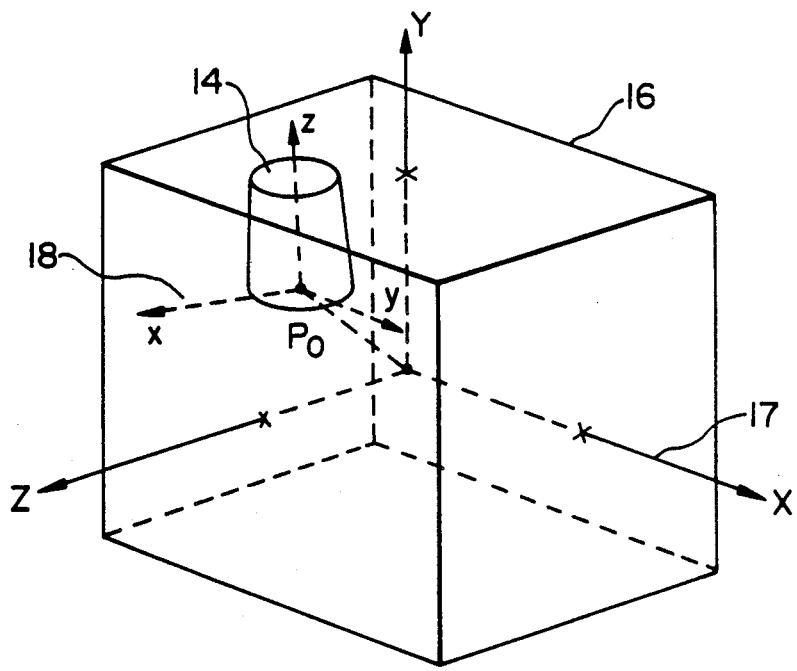
FIG. 3 illustrates a coordinate system for arranging the geometry entities in a three-dimensional space.

A method of producing a geometry entity in the graphic display control apparatus 2 will now be described with reference to FIG. 3. The graphic display control apparatus 2 is provided with a modeling space 16 shown in FIG. 3, which is set automatically in the interior thereof so as to model a three-dimensional shape. The modeling space 16 has a modeling coordinate system 17. The modeling coordinate system 17 is a rectangular coordinate system, and is shown by (X, Y, Z). A geometry entity 14 also has a geometry entity system 18 as shown in FIG. 3. The geometry entity coordinate system 18 is also the rectangular coordinate system and shown by (x, y, z).

When the geometry entity 14 is produced in the interior of the graphic display control apparatus 2, the modeling coordinate system 17 and the geometry entity coordinate system 18 agree with each other. The amounts of movement and rotation of the geometry entity 14 in the modeling space 16 are expressed by the amount of movement $P_0$ ($X_0$, $Y_0$, $Z_0$) and the amount of rotation F ($3 \times 3$ matrix) of the geometry entity coordinate system 18 with respect to the modeling coordinate system 17. A point P' (x, y, z) in the geometry entity coordinate system 18 can be converted into a point P (X, Y, Z) in the modeling coordinate system 17 in accorance with:

$$P = (F)P' + P_0 \tag{1}$$

The equation (1) can be expressed by its components as follows.

$$\begin{pmatrix} X \\ Y \\ Z \end{pmatrix} = \begin{pmatrix} a_{11} & a_{12} & a_{13} \\ a_{21} & a_{22} & a_{23} \\ a_{31} & a_{32} & a_{33} \end{pmatrix} \cdot \begin{pmatrix} x \\ y \\ z \end{pmatrix} + \begin{pmatrix} X_0 \\ Y_0 \\ Z_0 \end{pmatrix} \quad (2)$$

The graphic display control apparatus 2 preserves therein the information on the shape, amount of movement and amount of rotation of each geometry entity 14.

The grouping of the geometry entities 14a, 14b, 14c and 14d will now be described with reference to FIGS. 4-8. An ordinary three-dimensional structure is described as a synthesis of a number of parts, and the parts may be regarded as the synthesis of a number of the geometry entities 14a, 14b, 14c and 14d.

Figure 4:
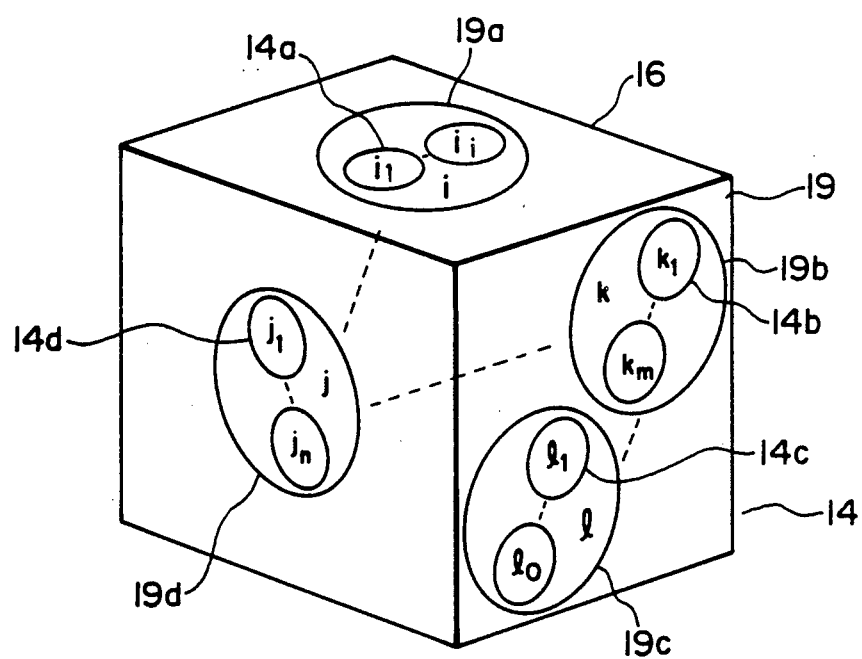
FIG. 4 illustrates synthesis of the primitive solids.

FIG. 4 shows such an idea, in which a number of the synthesis 19a, 19b, 19c and 19d of the geometric entities 14a, 14b, 14c and 14d exist in the modeling space 16. In this figure, the synthesis 19a, 19b, 19c and 19d of the geometric entities are described as the synthesis of the geometric entities 14a, 14b, 14c and 14d. The piping equipment 13 and the vessel equipment 15 shown in FIGS. 2A and 2B correspond to these synthesis 19a, 19b, 19c and 19d of the geometric entities 14a, 14b, 14c and 14d.

Figure 5:
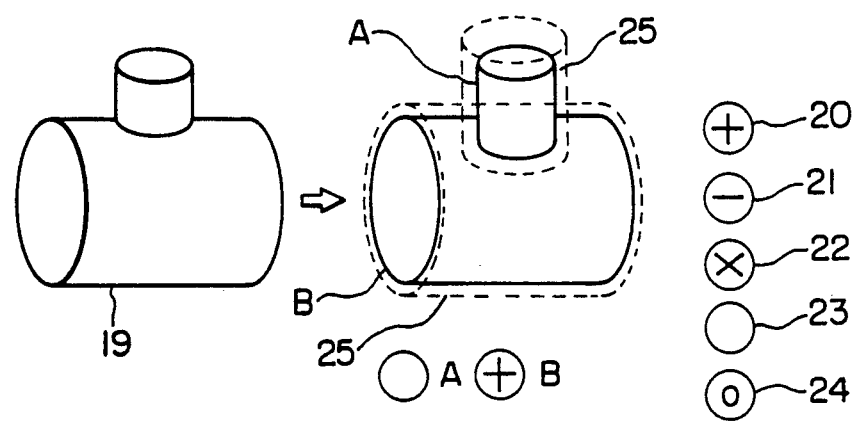
FIG. 5 illustrates types of set operation carried out between the primitive solids.

FIG. 5 shows an example in which the synthesis 19 of the geometric entities 14 is described as a synthesis of the geometric entities A and B. The synthesis 19 of geometric entities 14 is described as an union of the geometric entities A and B by arranging the geometric entity A in the modeling space 16, and then producing the geometric entity B.

The synthsis describing modes 20, 21, 22, 23 and 24 consists of an union mode 20, a subtraction mode 21, an intersection mode 22, an arrangement mode 23 and an interference check mode 24, which are controlled as shape information with respect to each geometric entity in the graphic display control apparatus 2. The synthesis describing mode or arrangement mode 23 is a mode of describing the arrangement only of the geometric entities 14. The synthesis describing mode or interference check mode 24 is used when an interference check shape mode 25 is defined. This interference check shape is a shape to be checked when an interference check demand is made.

Figure 6A:
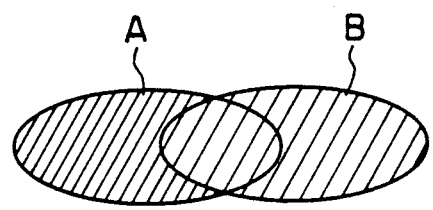
FIG. 6A illustrates the union result of set operation carried out between the primitive solids.
Figure 6B:
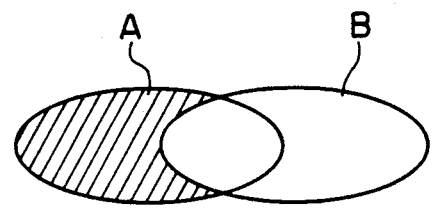
FIG. 6B illustrates the subtraction result of a set operation carried out between the primitive solids.
Figure 6C:
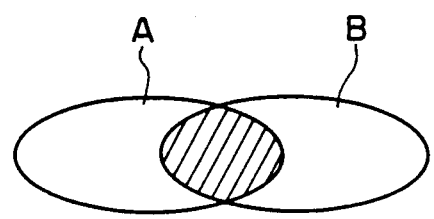
FIG. 6C illustrates the intersection result of a set operation carried out between the primitive solids.

FIGS. 6A, 6B and 6C illustrate the set operation, and the synthesis describing mode 20 is a mode of determining union among the geometric entities 14. The synthesis describing modes 21 and 22 are the modes of determining subtraction and intersection, respectively, among the geometric entities 14. FIGS. 2A and 2B, which are referred to in the previous paragraph, show two examples described by using the arrangement mode 23 in synthesis modes.

Figure 7A:
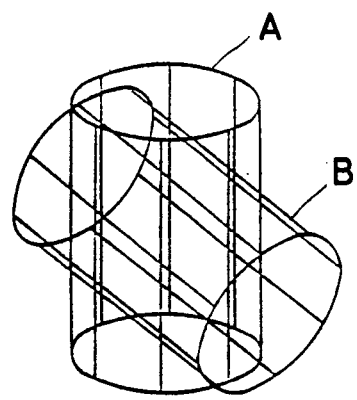
FIG. 7A shows the positional relationship between the primitive solids A and B.
Figure 7B:
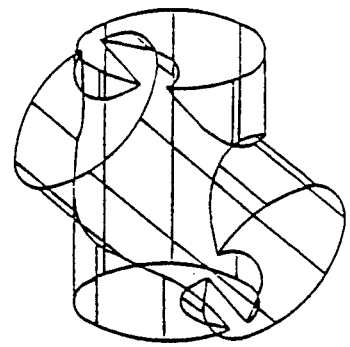
FIG. 7B shows the results of the union (A+B) of the primitive solids A and B.
Figure 7C:
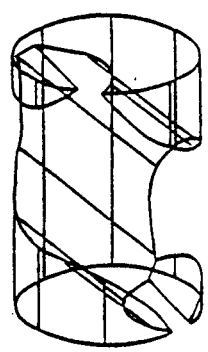
FIG. 7C shows the results of the subtraction (A−B) of the primitive solids A and B.
Figure 7D:
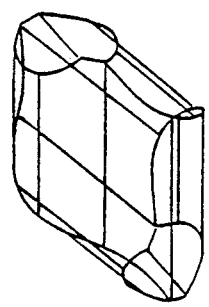
FIG. 7D shows the results of the intersection (A·B) of the primitive solids A and B.
Figure 8A:
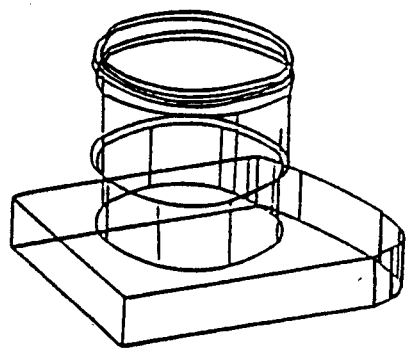
FIG. 8 illustrates the steps (a),(b),(c) and (d) of producing an object shape by the synthesis operation carried out between the primitive solids.
Figure 8B:
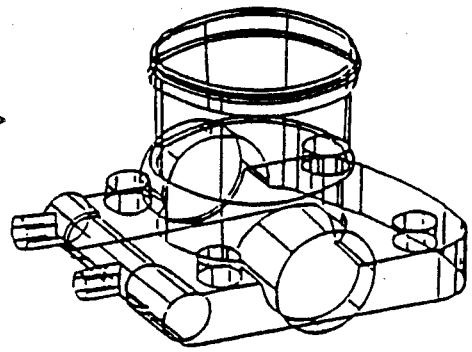
Figure 8C:
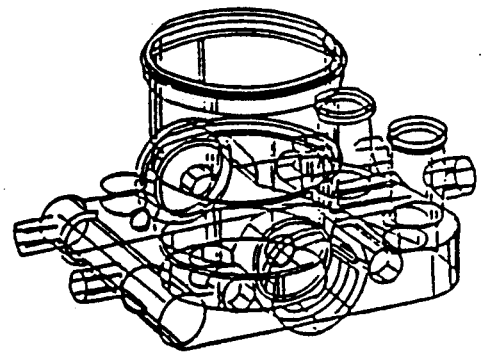
Figure 8D:
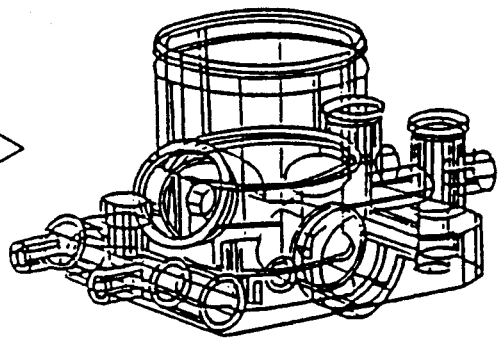

FIGS. 7A, 7B, 7C and 7D illustrate four concrete examples of the set operation, in which FIG. 7A shows the positional relationship between the geometric entities A and B. FIG. 7B shows the results of the union (A+B) of the geometric entities A and B, FIG. 7C the results of the subtraction (A−B) of geometric entities A and B, and FIG. 7D the results of the intersection (A·B) of the geometric entities A and B.

FIG. 8 shows an example of a product obtained by using a metal mold and made by carrying out the set operation among the geometric entities in the order of the steps (a), (b), (c) and (d), i.e., repeating the union mode 20 and subtraction mode 21.

It is necessary that the three-dimensional shape thus produced in the interior of the graphic display control apparatus 2 be indicated on the graphic display 12. This display operation will now be described with reference to FIGS. 9A and 9B.

Figure 9A:
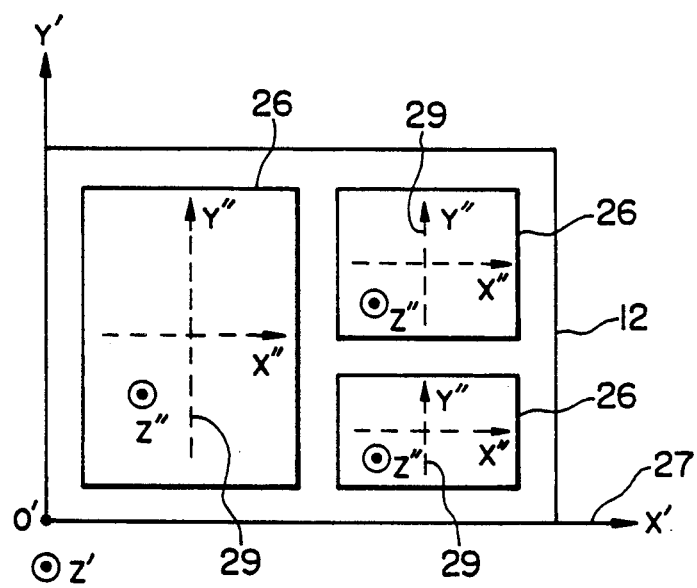
FIG. 9A illustrates windows indicated on a display frame on the graphic display apparatus.
Figure 9B:
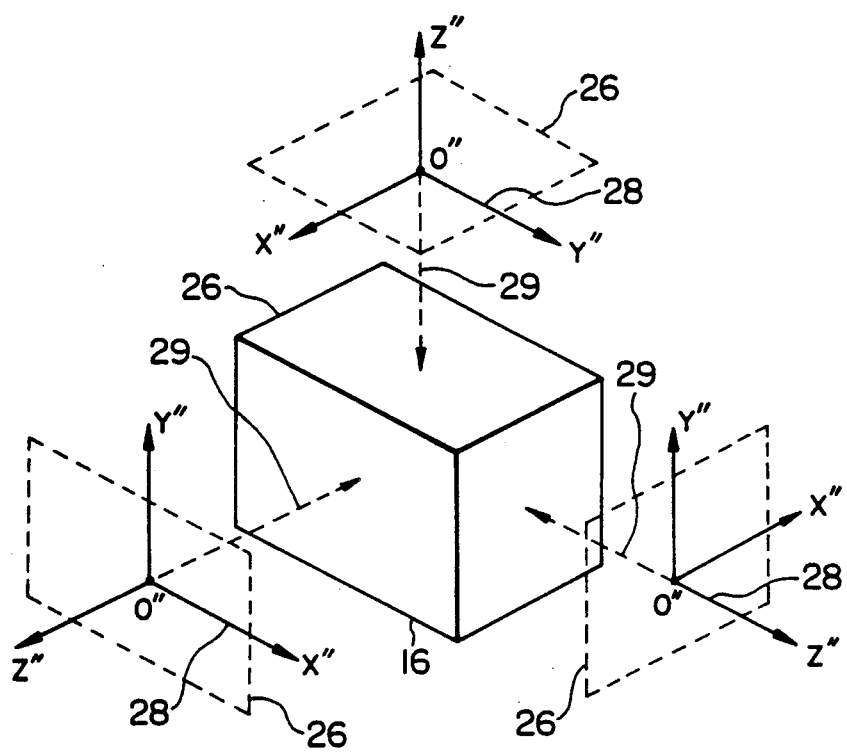
FIG. 9B illustrates coordinate systems indicated on a display frame, on the graphic display apparatus.

FIG. 9A shows an example of a graphic display which is capable of indicating a number of windows 26 simultaneously on the picture frame thereon. A display coordinate system (X', Y', Z') 27 is set on the graphic display 12, and the direction which is at right angles to the upper surface of the picture frame and extends upward therefrom is the positive direction of Z'. The window 26 is also provided with a window coordinate system (X", Y", Z") 28. The origin O" of the window coordinate system 28 is in the position of a visual point at which the modeling space 16 is observed.

A three-dimensional shape produced in the modeling space 16 is projection-converted and described in the window coordinate system 28. A projected shape (a shape expressed with all Z" set to zero) is produced on the X"Y"-plane in the window coordinate system 28, and indicated on the picture frame on the graphic display 12. The negative direction of the Z'-axis of the window coordinate system 28 agrees with the visual direction 29. The window coordinate system 28 can be set to an arbitrary position and posture by the designer 1, and the relative window control information is controlled in the interior of the graphic display control apparatus 2.

The controlling of the data in the interior of the graphic display control apparatus 2 will now be described with reference to FIGS. 10-14. FIG. 10 shows the general construction of the inerior of a one-dimensional memory in the graphic display control apparatus 2. The information to be controlled is roughly divided into four groups, i.e. (i) window control information, (ii) synthesis information, (iii) geometry entity information, and (iv) display attribute information, each of which consists of a cell structure.

These information groups are connected to pointers, and the first pointers for the information groups are controlled at the head portion of the one-dimensional memory. First, the pointer for the window control information is controlled.

If an address i for the pointer is retrieved, the window control information can be taken out sequentially. In the second place in the one-dimensional memory, a pointer j for the synthesis information is stored. If an address j is retrieved, the synthesis information can be taken out. The same applies to the geometry entity information and display the attribute information. In the fifth place in the one-dimensional memory, a pointer for an empty area is stored, which is utilized for the regeneration of a deleted area.

FIGS. 11A, 11B and 11C show the control items for the window control information, which is the information controlled relative to each window 26 indicated on the graphic display 12. The internal name of the window control information is a name which can be determined by a serial number in the interior of the graphic display control apparatus 2, and the external name thereof is a name which can be determined freely by the designer 1.

Regarding the type of projection, either the orthographic projection or the perspective projection can be selected. The visual point is the origin of the window coordinate system 28 in the window 26 at which the modeling space 16 is observed. A projection matrix is used to convert one point in the modeling coordinate system 17 into one point in the window coordinate system 28.

The window display range as shown in FIG. 11B is between the coordinate values in the left lower corner and right upper corner in the window 26 with respect to the display coordinate system 27. The display range in the modeling space as shown in FIG. 11C is to represent the part of the modeling space 16 which is to be displayed on the windows 26, and it is described as a point at an angle which represents a rectangular parallelepiped parallel to the axis of the modeling coordinate system 17.

The light source information can be provided for each window 26, and a parallel light source or a spot light source can be selected. The position of the light source is described as a point in the modeling space 16. The color and luminance of the light source can be designated. The color is described as a mixture of the three primary colors (R: red, G: green, and B: blue) of the light. The luminance of each color shall be able to be defined between zero and 255, and it is described as:

$$I = R \times 10^6 + G \times 10^3 + B \tag{3}$$

Besides the light source, the ambient light can be defined in the same manner as the light source.

FIG. 12 shows the data items of the synthesis information. In the first word, a pointer for the subsequent synthesis information cell is controlled. The internal and external names of the synthesis information are the same as those of the window control information. The pointers for the geometry entities information are the pointers for the information on the geometry entities constituting the synthesis. If these pointers are traced, the information on all the geometry entities that constitute the synthesis can be obtained.

FIG. 13 shows the data items of the geometry entity information cell. The first three items are identical with those in the above-mentioned cell. In the synthesis describing mode, the amount of movement and the amount of rotation are as referred to previously.

The pointer for the attribute information to be displayed is the pointer for a cell in which the attributes (for example, the reflection coefficient of a display surface) used when the geometry entities are displayed are controlled. The pointer for the subsequent geometry entity information is a pointer for a cell for the information on the geometry entities which constitute a synthesis. If these pointers are traced, the information on all the geometry entities that constitute the synthesis can be retrieved. The pointer for the synthesis information is provided so as to simply identify a synthesis to which the geometry entities belong.

The subsequent items, i.e. the name of restraining geometry entity and the number of constituent surface are the information on the surface which restrains the origin of the geometry entity for this cell. The name of restraining geometry entity is the external name of a geometry entity having a restraining element, and the number of constituent element and the number of the element of the geometry entity.

The amount of data on the shape parameter of the geometry entity indicates the number of words of the geometry entity parameter of the subsequent item. The shape parameter of the geometry entity is measurement data characterizing the geometry entity.

FIGS. 14A and 14B show the data items in a display attribute information cell. The first word in the cell display attribute information indicates a pointer for the subsequent display attribute information. The second item is an index of display attribute, which is set automatically in the graphic display control apparatus 2.

The following information is used to express a reflection model in the displaying of a surface, in which the information includes an ambient light reflection coefficient ka, a diffuse reflection coefficient kd, a direct reflection coefficient ks, a diffuse reflection index r and a direct reflection index h. Let Ia equal the intensity of the ambient light, and Ip equal the intensity of the light from the light source. The intensity I of the light which can be observed at the point P in FIG. 14B can be determined by:

$$I = ka \cdot Ia + (kd \cdot (N \cdot L)^r + ks \cdot (R \cdot V)^h) Ip \tag{4}$$

This calculation is carried out with respect to R(red), G(green), and B(blue) separately. In the display attribute information cell, each reflection coefficient can be described with respect to the three components R, G, B, so that the feeling of the material of the surface of a three-dimensional shape can be arbitrarily expressed. Various types of such reflection models have been devised, and a multi-purpose reflection model capable of describing a refractive index and transmissivity has been developed.

The geometry entities 14 which can be handled in the graphic display control apparatus 2 will now be described with reference to FIGS. 15-20. Each of the geometry entities 14 can be divided into four kinds of entities, i.e. (i) segment entities, (ii) plane entities, (iii) curved surface entities, and (iv) solid entities.

FIG. 15 shows the segment entities. A point, a straight segment, a circle/a circular arc, an ellipse/an elliptic arc and a free curve can be defined as geometry entities 14, and the geometrical information for describing the geometry entities is shown at once. The geometrical information includes shape-describing shape parameters and shape-identifying entity types, which are controlled in the portion for shape parameters of the shape information cell shown in FIG. 13.

A point is produced at the origin of the geometry entity coordinate system 18, and has no shape parameters. A straight segment is described by segment length, and produced on an x-axis of the geometry entity coordinate system 18. A circle/a circular arc is described to a radius R and at an angle θ from the x-axis. An ellipse/an elliptic arc is described similarly to a longer radius A and a shorter radius B and at an angle θ.

A free curve shall consist of a number of smoothly-connected segments, each of which shall be expressed by a third order Bezier curve. If $P_1$, $P_2$, $P_3$, $P_4$ shown in FIG. 16 are set as control points, a third Bezier curve R(t) (wherein t is an auxiliary variable and $0 \leq t \leq 1$) can be expressed by the equation:

$$R(t) = (1-t)^3 + 3(1-t)^2 t P_2 + 3(1-t) t^2 P_3 + t^3 P_4 \tag{5}$$

This Bezier curve has the following characteristics. (i) The tangential directions of this curve at the starting and terminal points thereof agree with $P_1 P_2$ and $P_3 P_4$, respectively. (ii) When t=0 and t=1, this curve passes the control points $P_1$ and $P_4$. (iii) A curve expressed by R(t) is contained in a convex holl of polygon (hatched portion in FIG. 16). (iv) An arbitrary curve can be produced by displacing the control points. This curve has properties by which it is proven to be suitable to be subjected to a geometric modeling using a computer.

In FIG. 15, a local coordinate system (which can be produced freely in the modeling space 16) is also handled as a geometry entity. The shape parameters are the lengths A, B and C of the axes. The local coordinate system is used for the arrangement of figures, and will be described in detail later.

FIG. 17 shows plane entities, and a parallelogram, a circle, an ellipse, an equilateral polygon and an arbitrary shape defined by free curves can be defined as such plane entities. These plane entities are to describe regions on a plane, such as the hatched portions shown in FIG. 17, and they are produced in an xy-plane in the geometry entity coordinate system. A parallelogram is described by a shape parameters consisting of a width A, a height B, an angle $\theta$ and an option IOPT. The option is a parameter obtained by changing the normal direction of a plane, and IOPT=1 and IOPT=−1 indicate the following.

IOPT=1: The condition with the geometry entities already produced. The normal direction of the plane agrees with the positive direction of the z-axis of the geometry entity coordinate system.

IOPT=−1: The normal direction of the plane agrees with the negative direction of the z-axis.

A circle is described by a radius R, an angle of rotation $\theta$ and an option. An ellipse is described by a longer radius A, a shorter radius B, and angle $\theta$ and an option. An equilateral polygon is described by a radius R of a circum circle, a dividing number N and an option. An arbitrary shape is described by a closed loop of a shape defined in the segment.

To be concrete, the shape parameter consists of the number N of segment constituting a closed loop, the name Ai ($i=1-N$) of the segment and an option. The direction of the closed loop is defined so that, when the operation advances from the starting point to the terminal point of a segment in FIG. 17, the region on the left side of the path becomes the region of the plane.

FIG. 18 shows curved surface entities, which are the geometry entities often included in a mechanical structure. The geometry entities which can be handled are a cylindrical surface, a conical surface, a spherical surface, a torus surface and a freely curved surface.

The entity type of a cylindrical surface is 31, and the shape parameters thereof are a radius (R), a height (H), an option (IOPT), by which a shape is described. The option indicates the front and rear sides of a surface in the same manner as that in the above-mentioned surface entities.

The entity type of conical surface is 32, and is described by shape parameters consisting of a radius 1 ($R_1$), a radius 2 ($R_2$), a height (H), an eccentric amount (D) and an option (IOPT). The eccentric amount D is a quantity for expressing an eccentric conical surface, and shall be shown in the x-axis coordinate in the geometry entity coordinate system 18.

The entity type of a spherical surface is 33, and its shape parameters consist of a radius (R), a cut amount (D) and an option. The cut amount D is expressed by a coordinate value on the z-axis in the geometry entity coordinate system 18 ($-R \leq D < R$).

The entity type of a torus surface is 34, and is described by shape parameters consisting of a larger radius ($R_l$), a smaller radius ($R_s$), an angle ($\theta$) and an option (IOPT). The angle is a quantity indicating a defined area of a torus surface.

The entity type of a free curved surface is 35. The shape of a free curved surface is expressed by a number of smoothly-connected third order Bezier curved surfaces S (u, v) (wherein u and v are auxiliary variable; and $0 \leq u$ and $v \leq 1$). FIG. 19 shows a third order Bezier curved surface. Let $P_{00}, P_{01}, \ldots, P_{33}$ equal control points. This curved surface can be expressed by the equation:

$$S(u,v) = ((1-u)^3 \; 3(1-u)^2 u \; 3(1-u)u^2 \; u^3) \cdot \qquad (6)$$

$$\begin{pmatrix} P_{00} & P_{01} & P_{02} & P_{03} \\ P_{10} & P_{11} & P_{12} & P_{13} \\ P_{20} & P_{21} & P_{22} & P_{23} \\ P_{30} & P_{31} & P_{32} & P_{33} \end{pmatrix} \begin{pmatrix} (1-v)^3 \\ 3(1-v)^2 v \\ 3(1-v)v^2 \\ v^3 \end{pmatrix}$$

This curved surface has the same properties as the Bezier curved, and is suitable to be subjected to a geometric modeling using a computer. The shape parameters of a free curved surface consist of the number (patch numbers Nu, Nv) of Bezier curved surfaces in the u- and v- directions, the patch control points ($P_1-P_{16}$) corresponding to Nu x Nv, and an option (IOPT).

The solid entity will now be described. A solid entity is a three-dimensional partial space defined by surface, and it is possible to determine whether a point P in a three-dimensional space is contained in a partial space.

FIG. 20 shows a solid entity in this embodiment, in which a rectangular solid, a cylinder, a cone, a sphere, a torus, a column, a pyramidal body, a solid made by the revolution of any two-dimensional shape about one of its sides, and an arbitrary three-dimensional body are prepared.

The rectangular solid, cylinder, cone, sphere and torus are regarded as special examples of column, pyramidal body and a solid made by the revolution of any two-dimensional shape about one of its sides. However, these are the shapes often existing in the mechanical structures, and, therefore, they are also prepared so as to minimize the amount of data.

The entity type of a rectangular solid is 41, and is described by shape parameters consisting of a width (A), a length (B), a height (C), an option (IOPT). The option is a similar parameter obtained by reversing the front and rear surfaces constituting the three-dimensional entity, and it is similar to the option in the case of the above-mentioned surface entities.

The shape parameters of the cylinder, cone, sphere and torus are identical with those of the cylinder, cone, sphere and torus in the surface entities, and the entity types thereof are 42, 43, 44 and 45, respectively.

The primitive type of a column is 46, and is described by shape parameters consisting of the name (Ai wherein $i=1-N$) of a segment element corresponding to the numbers (N) and N of the segment included in the xy-plane in the geometry entity coordinate system 18, a height (H) and an option (IOPT). The name of the segment is the internal name of the synthesis shown in FIG. 14 or the internal name of the geometry entity shown in FIG. 13. The entity type of a pyramidal body is 47, and the shape parameters thereof consist of the number (N) of segments, name (Ai wherein $i=1-N$) of segments, and convergence point (P), height (H) and option (IOPT) of the pyramidal body.

The entity type of a solid made by the revolution of a two-dimensional shape about one of its sides is 48, and is described by shape parameters consisting of the number (N) of segments on the xy-plane in the geometry entity coordinate system 18, name (Ai wherein $i=1-N$) f the segment elements, an angle of rotation ($\theta$, $0° \leq \theta 360°$) and option (IOPT). Regarding all of the column, pyramidal body and a solid made by the revolution of a two-dimensional shape about one of its sides, a figure in the xy-plane in the geometry entity coordinate system 18 is handled as a figure described in the same manner as the surface entities of FIG. 17.

The entity type of an arbitrary three-dimensional body is 49, and is handled as a shape closed with surfaces. The shape parameters of this three-dimensional body consist of the number (N) of surfaces, name (Ai wherein $i=1-N$) of surfaces, and an option (IOPT). The name of surfaces represents the internal name of the synthesis of FIG. 12 or the internal name of the geometry entities of FIG. 13.

An object having a three-dimensional shape is produced in the graphic display control apparatus 2 on the basis of the above-described geometry entities 14. It is necessary that the three-dimensional shape produced in the graphic display control apparatus 2 be indicated on the graphic display 12, so as to have the designer 1 identify the same.

The methods of indicating a three-dimensional shape on the graphic display 12 include two methods, i.e. (i) a wire frame display method, and (ii) a color shading display method. The wire frame display method (i) is a method of indicating the characteristic entities of a three-dimensional shape, for example, an edge line, a contour line and an intersecting line on the graphic display. In this wire frame display method, a circle, an ellipse and a free curve are divided into small straight segments as shown in FIGS. 21A-21F, when they are displayed.

The color shading display method (ii) is a method of indicating a three-dimensional shape by shading the surfaces thereof. In this color shading display method, a two-dimensional curved surface, such as a cylindrical surface, and a free curved surface are divided into polyhedral surfaces and indicated on the graphic display 12. In this case, each pixel is subjected to a negative surface processing operation by a display method called a depth buffer method using the viewing direction as the depth, and an indication of surfaces is done on the graphic display 12.

Recently, a method using a vector of the normal of a curved surface at each apex of a polyhedron in FIGS. 22A-22D has been developed in which a more real figure can be displayed. For example, a three-dimensional entity shown in FIG. 20 is extended to a surface constituting the same, and indicated on the graphic display 12 by the same operation as mentioned above.

An expansion depth buffer method, which conists of the above-mentioned depth buffer method and a synthesis describing mode employed therein, has been developed so as to materialize a mode of describing a synthesis of the geometry entity shown in FIG. 5. If this method is used, the three-dimensional shape described by the abovementioned method can be displayed in real state.

In the above-described embodiment, an object having a three-dimensional shape is indicated on the picture frame of the graphic display 12 by a method, in which a curve element and a curved surface element are expressed by a synthesis of straight segments and a synthesis of polygons, respectively, as shown in FIGS. 21A-21D and 22A-22D with a curve and a curved surface expressed by a Bezier curve and a Bezier curved surface, respectively. Therefore, when an apparatus for displaying Bezier curves and Bezier curved surfaces has been developed, a curve and a cruved surface may not be divided into straight segments and polygons, and the graphic display efficiency can be further improved.

According to this embodiment of the graphic display method of the present invention wherein the graphic processing is effected, the display information, such as the projection information can be prepared within the apparatus, and the amount of information to be transferred can be reduced to an extremely low level, by describing and controlling the three-dimensional complicated object shape as a synthesis of the geomerty entities.

In the interface between the graphic display apparatus using this graphic display method and the application system, the transferring of information in the form of the geometry entity is done. Accordingly, in order to change the three-dimensional shape, the related entity information alone may be transferred, so that the changing and inputting of a shape can be done efficiently.

Figure 23:
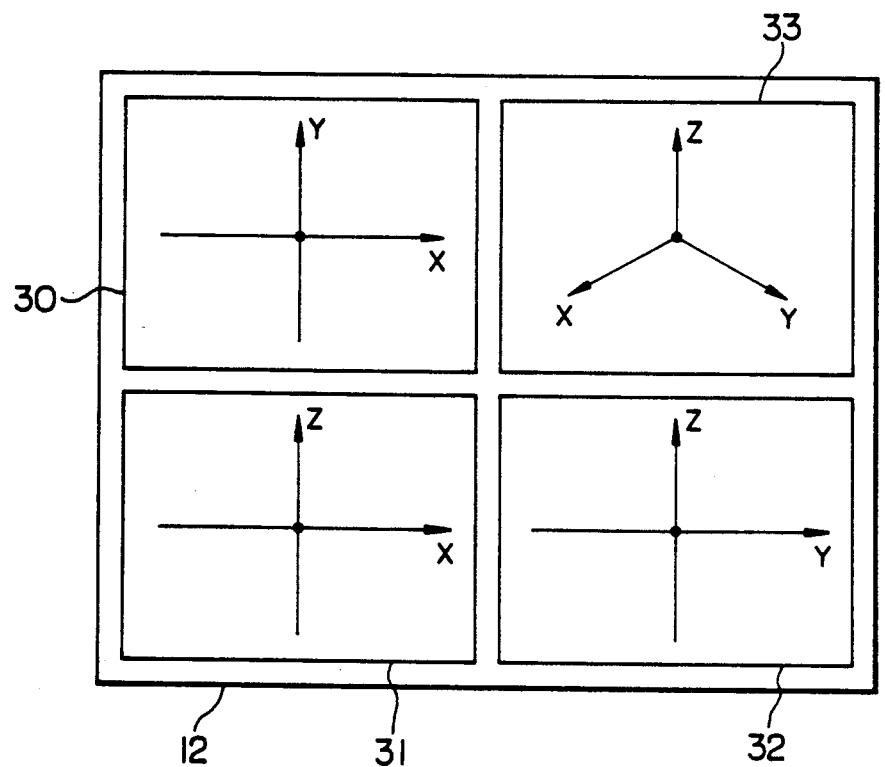
FIG. 23 illustrates a multi-window in the graphic display.

A system for transferring and rotating the geometry entities 14 will now be described with reference to FIG. 23. FIG. 23 shows the picture frame divided into four frames of the graphic display 12. A top view of the modeling space 16 is displayed on a divisional picture frame 30, a front view thereof on a divisional picture frame 31, a side view thereof on a divisional picture frame 32, by the third-angle projection system, a perspective view of the modeling space 16 being displayed on a divisional picture frame 33. This view information is controlled by the data construction shown in FIG. 11. The designer 1 produces and arranges entities by utilizing a number of pieces of view information.

The production and arrangement of entities will now be concretely described. The designer 1 inputs a required command 4 by the funtion key 7. The description will be continued on the assumption that a command for producing, for example, a cylinder is inputted. The parameters required to produce a cylinder are radius and height. The figure displaying control apparatus 2 demands the information on these parameters. To be concrete, guidance information is outputted to the upper side of the graphic display 12. In accordance with this demand, the designer 1 inputs the required parameters, i.e. the radius and height. If the inputting of radius and height is omitted, a default value is set automatically in the graphic display control apparatus 2.

When the inputting of the parameters have been completed, the entity information is controlled in the graphic display control apparatus 2, and the drawing data are prepared at the same time, which are indicated on the graphic display 12. The display of this data is done in accordance with the view information. For example, in the case of FIG. 23, the drawing data on a cylinder with respect to the four views are prepared and indicated on related divisional picture frames. The designer 1 confirms the results indicated on the picture frame on the graphic display 12 and starts the subsequent operations.

A method of moving the cylinder, which has been produced in the graphic display control apparatus 2, in the modeling space 16 will now be described. The designer 1 inputs a movement command from the function key 7. When a movement command has been inputted into the graphic display control apparatus 2, a question as to which entity is desired to be moved is made by the graphic display control apparatus 2. The designer 1 designates an entity, which he desires to move, with the stylus pen 6. The figure can be designated on any of the divisional picture frames on the graphic display 12.

In the case of a cylinder, the shape to be displayed of a cylinder is selected by using the stylus pen 6. The designer 1 then indicates by the stylus pen 6 a place to which the cylinder is to be moved, by using the four divisional picture frames 30, 31, 32 and 33. If the stylus pen 6 is moved in, for example, the divisional picture frame 30, a reference point of the cylinder is altered automatically in the graphic display control apparatus 2 so that the point to which the stylus pen 6 has been moved and the origin of the geometry entity coordinate system 18 of the cylinder agree with each other, and the drawing data on this condition are prepared, the resultant data being re-indicated on the graphic display 12.

The picture frame on the graphic display 12 has four divisional picture frames 30, 31, 32 and 33, on each of which the movement of the cylinder can be ascertained. This cylinder-moving operation is continued unless the stylus pen 6 comes to be in pen-up state or unless the stylus pen 6 moves out of the divisional picture frames 30, 31, 32 and 33, so that the dynamic arrangement of the entity can be carried out.

If the stylus pen 6 is moved in the divisional picture frame 30, the values of X and Y out of the reference points of the cylinder are dynamically altered. If the stylus pen 6 is moved in the divisional picture frame 31, the coordinate values of the reference points X, Z of the cylinder are dynamically altered. In the divisional picture frame 31, the coordinate values of Y, Z are altered dynamically in the same manner.

If the stylus pen 6 is moved in the divisional picture frame 32, it can advance in a plane which passes the origin of the geometry entity coordinate of the cylinder, and which has as a normal a vertical vector (a vector in the viewing direction) of the divisional picture frame 32. Owing to these systems, an entity can be set in an arbitrary position in the modeling space 16.

Figure 24:
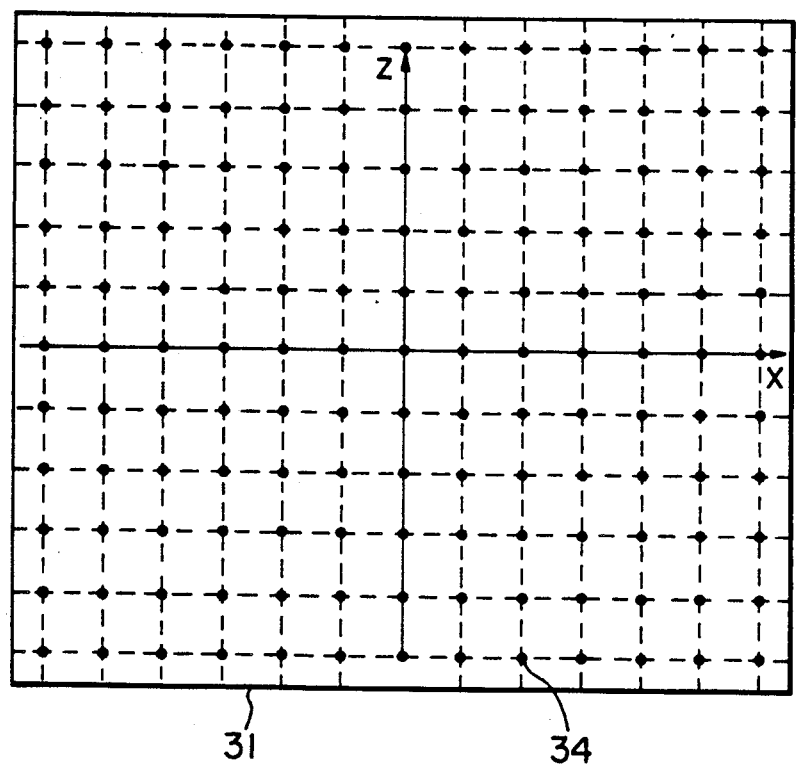
FIG. 24 illustrates lattice points for rounding the coordinate values detected by the stylus pen.

In this entity-arranging operation, the coordinate values detected by the stylus pen 6 are not round values. Therefore, a method of rounding the coordinate values detected by the stylus pen 6 is prepared. FIG. 24 illustrates a method of rounding the coordinate values detected by the stylus pen 6. A lattice is shown on the divisional picture frame 31, and a lattice point 34 which is the closest to the coordinate values detected by the stylus pen 6 is determined and used as the coordinate value determined by the stylus pen 6. The distance between the adjacent parallel lines in this lattice can be designated freely by the desiger 1.

Figure 25:
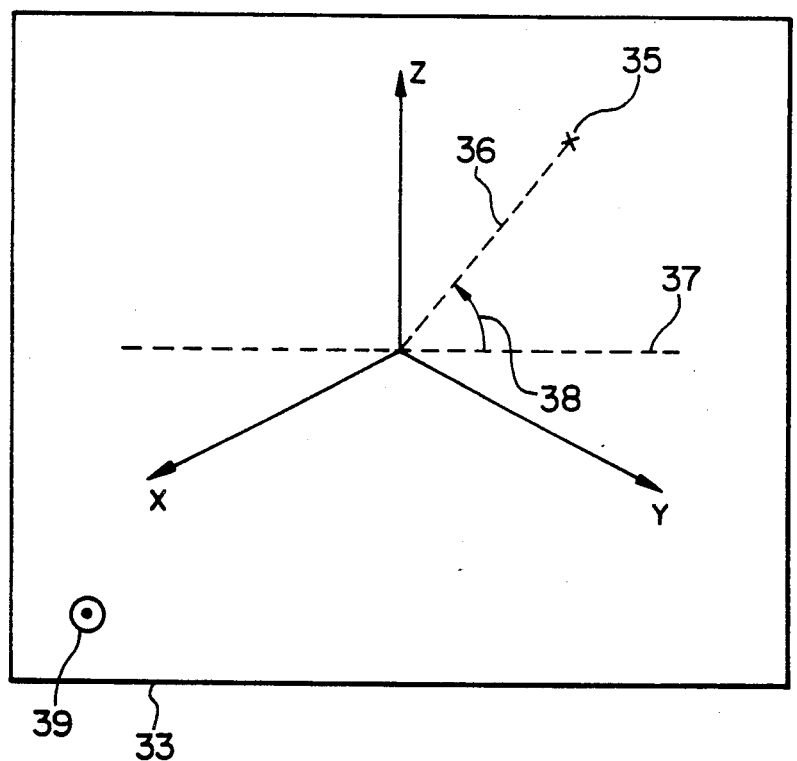
FIG. 25 illustrates the rotatoion of a figure in the divisional picture frame.

A entity rotating operation will now be described with reference to FIG. 25. FIG. 25 is an enlarged view of the divisional picture frame 33 shown in FIG. 23. When the stylus pen 6 is positioned on a coordinate point 35 in the divisional picture frame 33, an angle 38 between a segment 36, which connects the coordinate point 35 and the center of the divisional picture frame 33, and a horizontal axis 37 of the same picture frame can be determined. Let $\theta$ and $(, m, n)$ equal the angle 38 and vectors 39, which are perpendicular to the surface of the divisional picture frame 33, respectively.

A coordinate conversion matrix [F] used when an entity is rotated on the divisional picture frame 33 can be determined by the equation:

$$[F] = \begin{bmatrix} a_{11} & a_{12} & a_{13} \\ a_{21} & a_{22} & a_{23} \\ a_{31} & a_{32} & a_{33} \end{bmatrix} \quad (7)$$

wherein $a_{11} = \cos\theta + (1-\cos\theta)\cdot l\cdot l$ $a_{12} = -n\cdot\sin\theta + (1-\cos\theta)\cdot l\cdot m$ $a_{13} = m\cdot\sin\theta + (1-\cos\theta)\cdot l\cdot n$ $a_{21} = n\cdot\sin\theta + (1-\cos\theta)\cdot l\cdot m$ $a_{22} = \cos\theta + (1-\cos\theta)\cdot m\cdot m$ $a_{23} = l\cdot\sin\theta + (1-\cos\theta)\cdot m\cdot n$ $a_{31} = -m\cdot\sin\theta + (1-\cos\theta)\cdot l\cdot n$ $a_{32} = l\cdot\sin\theta + (1-\cos\theta)\cdot m\cdot n$ $a_{33} = \cos\theta + (1-\cos\theta)\cdot n\cdot m$ In this entity rotating operation, the coordinate conversion matrix of the equation (7) is applied to the coordinate conversion matrix constituting a reference for the entity. Unless the stylus pen 6 is in a pen-up state or unless the stylus pen 6 moves out of the divisional picture frame 33, the alteration of the coordinate conversion matrix is carried out, and the drawing data for each divisional picture frame are also altered, so that dynamic turning of the entity can be done.

Figure 26:
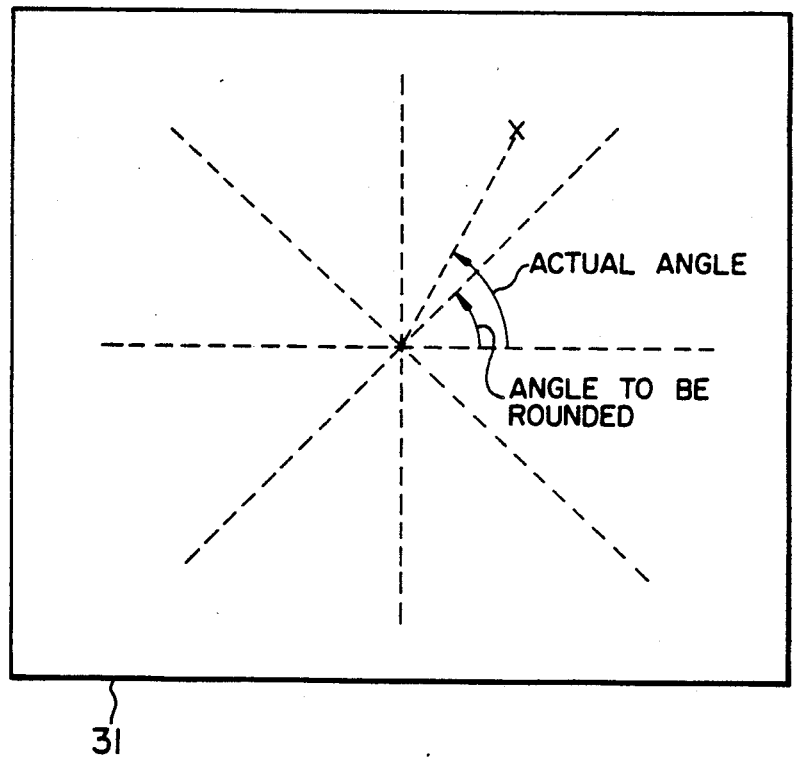
FIG. 26 illustrates a radial grid to obtain a round value of angle of rotation.

If the stylus pen 6 is extremely close to the center of the divisional picture frame 33 during this time, an error occurs in the calculation of the angle 38. Therefore, this case is disposed as a case which is not an object of the entity rotating operation. There are some cases where it is desirous to obtain a round value of angle of rotation as in the entity moving operation. In such a case, a radial grid shown in FIG. 26 is displayed, and the angle of rotation is calculated from a bar having the closest angle.

Figure 27A:
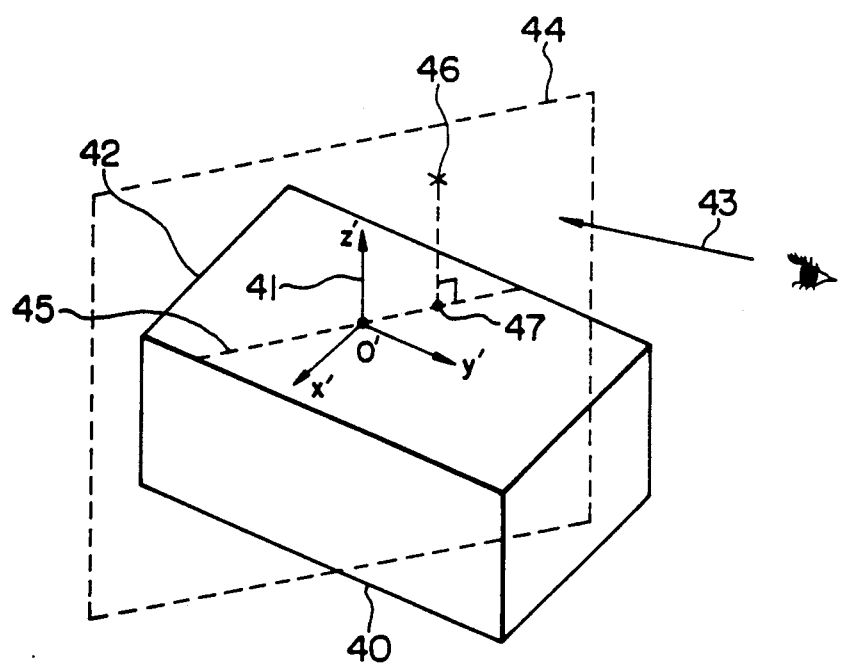
FIG. 27A illustrates a restraining method used on a plane.

Regarding the arrangement of entities, there are some cases where a desire to superpose an entity on another or a constituent entity of another arises. A method of satisfying these requirements will now be described. FIG. 27A shows a rectangular solid 40 with a local coordinate system 41 placed thereon.

In this case, the local coordinate system 41 is moved and rotated on plane 42 alone. The local coordinate system 41 is also regarded as one entity. The surfaces which can be designated as the restraining conditions include a plane, a cylindrical surface, a conical surface, a spherical surface and a torus surface. Concerning the turning of an entity on a surface, the above-mentioned method is used as it is.

In a system for arranging an entity on a surface, a desire to take out the direction of the normal of the surface arises in many cases. Therefore, the arrangement in which the z'-axis of the local coordinate system 41 is aligned with the direction of the normal, and the arrangement in which the z'-axis aligned with each axis of the modeling space 16 are prepared.

An operation for moving an entity on the surface will now be described. This operation is basically identical with the above-described operation but it is necessary to consider the restraint that an entity is to be placed on the surface. FIG. 27A shows the condition of the plane 42 on which the local coordinate system 41 is bound. A plane 44 is a plane parallel to the object divisional picture frame, passing through the center O' of the local coordinate system 41 and perpendicular to a view vector 43.

In this case, it is necessary that the entity (local coordinate system 41) be moved on the plane 42 of the rectangular solid 40, though this entity can be moved in the plane 44 in the entity moving operation as described previously. It is considered that the entity moves on an intersecting line 45 between the flat surface 42 and the plane 44.

The position, to which the local coordinate system 41 has been moved, which position corresponds to a coordinate point indicated by the stylus pen 6, is the foot 47 of a perpendicular line extending from the coordinate point 46 to the plane 42. The foot 47 of this perpendicular line is on the intersecting line 45 between the two planes.

When there is a restraint on the plane 42, the position to which the entity is to be moved is determined by the above-described method, and the amount of movement, the control information, is altered. At the same time, the drawing data are re-prepared and displayed on each divisional picture frame, to thereby carry out the dynamic arrangement of the entity.

The above is a description of the arrangement of an entity in a case where a flat surface constitutes the restraining conditions. In the case where the restraining conditions are a cylindrical surface, a conical surface, a spherical surface or a torus surface, the method used to determine the position to which an entity is to be moved is slightly different. This method will be described with reference to FIG. 27B.

Figure 27B:
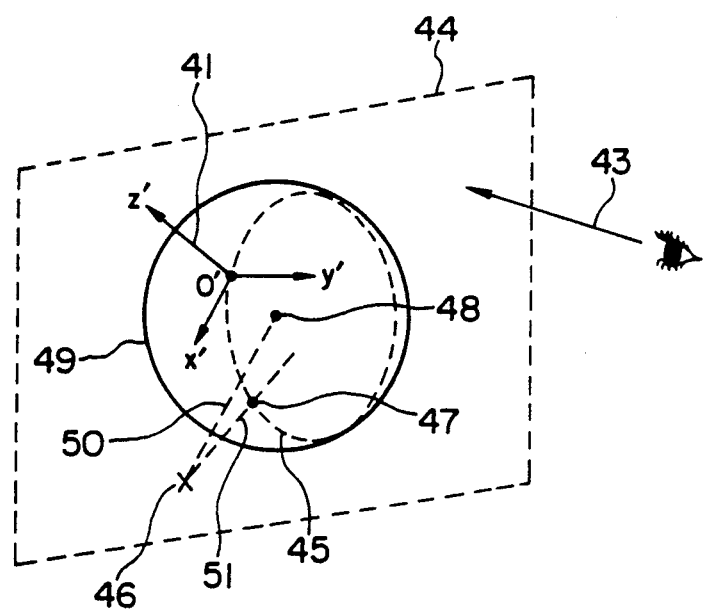
FIG. 27B illustrates a restraining method used on a spherical surface.

FIG. 27B is substantially identical with FIG. 27A, and shows the local coordinate system 41 restrained on a spherical surface 49. The place on which the local coordinate system 41 can be moved is the intersecting line 45 between the plane 44 and the spherical surface 49.

The position to which the local coordinate system 41 is to be moved, and to which a coordinate point 46 indicated by the stylus pen 6 corresponds, is the intersecting point 47 of a segment 51, which is obtained by projecting a perpendicular line 50 extending from the coordinate point 46 to the spherical surface 49 onto the plane 44, and the same spherical surface 49. The intersecting point 47 is on the intersecting line 45 between the plane 44 and the spherical surface 49.

The above is a description of a case where the a spherical surface constitutes the restraining conditions. Regarding a cylindrical surface, a conical surface and a torus surface, similar perpendicular lines can also be determined. The intersecting point of the segments, which are obtained by projecting such perpendicular lines onto the plane 44, and a cylindrical surface, a conical surface and a spherical surface can be easily determined. A straight segment can be expressed by the equation:

$$x = x_0 + t$$

$$y = y_0 + mt$$

$$z = z_0 + nt \qquad (8)$$

$$-\infty < t < \infty$$

The second order curved surfaces of a cylindrical surface, a conical surface and a spherical surface can generally be expressed by the equation:

$$ax^2 + by^2 + cz^2 + dxy + eyz + fzx + gx + hy + iz + j = 0 \qquad (9)$$

If the equation (8) is substituted for the equation (9), the second order equation concerning an auxiliary variable t is obtained and can be solved easily. In the case of a torus surface, the equation (9) becomes a fourth order equation. If the equation (8) is substituted for this equation, a fourth order equation concerning t is obtained, which can also be solved algebraically.

As is understood from the above-described embodiments, an entity can be set in an arbitrary position in an arbitrary situation by movement and rotation the same as with an arbitrary divisional picture frame utilized, so that the three-dimensional designing of the mechanical structure can be done easily. An entity can be set on a plane, a second order curved surface and a torus surface, so that the fixing of parts can be simulated easily.

In the above embodiments, only the descriptions of up to a second order curved surface as the restraining conditions are given. However, if the intersecting line between a free curved surface and a plane, and the foot of a perpendicular line extending from an arbitrary point to the intersecting line are determined, a coordinate value on the free curved surface and the direction of the normal of the surface can be determined, and the results can be utilized for the restraining of the entity. If the numbers of the constituent surfaces in FIG. 13 is handled as meaningless numbers, the restraining of the entity can be done for all geometry entity or all synthesis geometry.

According to the above-mentioned embodiment of the present invention, the arrangement of entities can be carried out dynamically by using picture frames, on which an entity is displayed by the third-angle projection which is utilized in the preparation of drawings using the perspective view taken in an arbitrary direction, and the condition of the arranged entities can be recognized easily. Moreover, the assembled condition of the mechanical structure drawn in the brain of the designer can be easily produced, and the designing time thereof can be greatly reduced.

What is claimed is:

1. A graphic display method in a graphic display apparatus for performing geometric modeling functions by controlling graphic information, comprising the steps of:

dividing a three-dimensional shape into a number of geometry entities and memorizing said geometry entities in advance;

defining a given object having a three-dimensional shape as a synthesis of said memorized geometry entities, said synthesis being obtained by moving and rotating said geometry entities using moving and rotating information; and displaying said defined three-dimensional shape;

wherein a geometry entity is a combination of segment entities, plane entities, curved surface entities and solid entities;

wherein said graphic display apparatus is provided with a modeling space which includes a three dimensional modeling coordinate system for modeling said three-dimensional shape and a geometry entity coordinate system for identifying a posture of said geometry entity in said modeling space in accordance with moving and rotating information of said geometry entity;

wherein said graphic display apparatus independently performs graphic functions on said geometry entity coordinate system and said three dimensional modeling coordinate system;

wherein said indicating a location of said geometry entity coordinate system in said three-dimensional modeling coordinate system and data for fixing said three dimensional modeling coordinate system in said modeling space are stored separately from each other in memory;

wherein said graphic display apparatus independently modifies said data for indicating a location of said geometry entity coordinate system and said data for fixing said three dimensional modeling coordinate system; and wherein said graphic display apparatus independently supplies said moving information and said rotating information to said defining step.

2. A graphic display method according to claim 1, wherein an interface is provided for converting each of said divided memorized geometry entities related to said defined three-dimensional shape into a format such that said defined three-dimensional shape can be displayed.

3. A graphic display method according to claim 1, wherein said defined three-dimensional shape is produced by a set operation of at least one selected from a union, a subtraction, an intersection, and only one layout mode.

4. A graphic display method according to claim 3, wherein said defined three-dimensional shape is provided for an interference check.

5. A graphic display method according to claim 1, wherein an amount of movement and an amount of rotation of said geometry entity in said modeling space are expressed by an amount of movement and an amount of rotation of said geometry entity coordinate system with respect to said modeling coordinate system.

6. A graphic display method according to claim 1, wherein said step of displaying displays said defined three-dimensional shape in a plurality of windows, and wherein said graphic information to be controlled in said graphic display apparatus includes window control information, synthesis information, geometry entity information, and display attribute information.

7. A graphic display method according to claim 1, wherein said displayed defined three-dimensional shape is indicated in a number of windows, and each window is provided with a window coordinate system.

8. An entity arrangement and display method in graphic display apparatus having a display unit, a computer connected to said display unit, a keyboard, a tablet and a stylus pen, comprising the steps of:

determining two-dimensional drawings, which are taken in a plurality of directions, of one object to be displayed;

indicating geometry entities in a divided manner on the display surface of said display unit, said geometry entities being divided into a top view, a front view and a side view representing corresponding divisional display picture frames;

setting the surface of said tablet and said divisional display picture frames correspondingly to each other and converting a demand by said stylus pen on said tablet into a demand for a corresponding divisional display picture frame; and carrying out moving and rotating of each of said geometry entities so as to arrange and display said geometry entity using a lattice point or a grid to round numerical values related to position of said geometry entity to the next integer value wherein said graphic display apparatus independently performs graphic functions on a geometry entity coordinate system for identifying a posture of said geometry entity and a three-dimensional modeling coordinate system for modeling a three-dimensional shape in a modeling space;

wherein data indicating a location of said geometry entity coordinate system in said three-dimensional modeling coordinate system and data for fixing said three-dimensional modeling coordinate system in said modeling space are stored separately from each other in a memory;

wherein said graphic display apparatus independently modifies said data for indicating a location of said geometry entity coordinate system and said data for fixing said three-dimensional modeling coordinate system; and wherein said graphic display apparatus independently supplies moving information for moving said geometry entity and rotating information for rotating said geometry entity to said carrying out step.

9. An entity arrangement and display method according to claim 8, wherein a perspective view is also displayed in addition to said views.

10. An entity arrangement and display method according to claim 8, wherein said geometry entities are moved or rotated on a predetermined surface of another geometry entities.

* * * * *